United States Patent [19] [11] 3,845,382
Förster [45] Oct. 29, 1974

[54] METHOD OF MAGNETOGRAPHIC INSPECTION OF METAL PARTS USING A ROLL OF MAGNETIC TAPE HAVING AN ADHESIVE COATING

[76] Inventor: Friedrich Martin Förster, Grathwohlstrasse, 4, D7410 Reutlingen, Germany

[22] Filed: May 29, 1973

[21] Appl. No.: 364,711

[30] Foreign Application Priority Data

Nov. 2, 1972 Germany 2253688

[52] U.S. Cl. 324/37, 161/167, 156/579
[51] Int. Cl. G01r 33/12
[58] Field of Search 324/37, 38; 209/111.8

[56] References Cited

UNITED STATES PATENTS 2,994,032 7/1961 Hansen 324/38
3,262,053 7/1966 Nasir et al. 324/37
3,315,805 4/1967 Brenner et al. 209/111.8

FOREIGN PATENTS OR APPLICATIONS 540,600 10/1941 Great Britain 209/111.8
1,237,864 6/1971 Great Britain 324/37

*Primary Examiner*—Robert J. Corcoran
*Attorney, Agent, or Firm*—George J. Netter

[57] ABSTRACT

A magnetic tape is adhered to a metal part surface over the zone to be tested by stray field techniques in such manner that the tape is brought into intimate and continuous contact with the entire zone surface. The zone is magnetized, after which the tape is separated from the part for scanning inspection. The adhesive joint may be provided, alternatively, by applying a coating of an adhesive compound either to the surface of the zone to be tested or to that side of the magnetic storage tape which is to be bonded. In a further aspect, luminous pigments or pigments providing a good contrast to the specimen are mixed with an adhesive compound and applied to the specimen, after which the magnetic tape is pressed thereon. Elastic pressure rollers conforming to the profile of the specimen surface press the magnetic storage tape against the specimen. In yet another aspect, the magnetic storage tape is reeled into rolls and unwound directly onto the surface of the test specimen. The tape may be unwound by hand, or alternatively, a special pay-off device may be used.

5 Claims, 7 Drawing Figures

METHOD OF MAGNETOGRAPHIC INSPECTION OF METAL PARTS USING A ROLL OF MAGNETIC TAPE HAVING AN ADHESIVE COATING

The present invention relates generally to the testing of metal parts for defects by magnetic means, and more particularly to magnetographic inspection and testing of ferromagnetic components for defects, in which the zone of a part to be tested is magnetized and the zone is brought into contact with a magnetic storage carrier, whereby the magnetic leakage flux emanating from the surface of the zone to be tested at points where defects are located is stored in the magnetic storage carrier.

BACKGROUND

In the art of magnetic testing of materials, the so-called magnetographic method has been known for a long time and used for practical testing applications in various embodiments. For example, the method is employed on a growing scale for testing rolling mill products such as billets and the like. Another field in which magnetographic inspection has attained major importance is the testing of long welds such as the longitudinal seams of welded tubes.

The storage carrier employed in most of these applications takes the form of elastic tapes with embedded fine magnetic particles. In principle, these storage tapes are similar to the well-known tapes employed in sound recording and data storage applications, but are adapted in shape, dimensions, mechanical and magnetic properties to the specific requirements of magnetographic inspection techniques.

To magnetize the test specimens or parts for magnetographic inspection, varied techniques are employed, such as fluxing the zone to be tested with an electric current passing through the specimen in the direction in which defects are most likely to occur, e.g., in the rolling direction where rolling mill products are concerned. Naturally, techniques have proved more advantageous in which the test specimens need not be contacted electrically so that, among other things, the costly and time-consuming procedure of descaling rolling mill products in preparation for such contacting can be omitted. Apart from the more conventional method of magnetization by means of DC magnetic fields, magnetization by alternating fields is also possible, in accordance with the copending U.S. Pat. No. 3,534,258, issued Oct. 13, 1970, entitled MAGNETIC NONDESTRUCTIVE TESTING SYSTEM UTILIZING MAGNETIC TAPES WITH MEANS TO INDICATE FLOW DEPTH by Friedrich M. O. Forster, if magnetic storage tapes used are first premagnetized to saturation in a DC magnetic field.

Several different techniques can also be distinguished with respect to the manner of bringing the magnetic storage tape into contact with the surface of a test specimen. According to the simplest procedure, the magnetic storage tape merely rests on top of the surface to be tested. However, since the magnetic leakage fields produced by defects decrease rapidly as the distance from the surface increases it is important that the magnetic storage tape be maintained in intimate contact with the surface zone to be tested at all points. Thus, if the magnetic storage tape is simply placed on top of the surface to be tested, the required intimate contact is only possible if the surface of the test specimen is smooth and completely free of irregularities.

According to another technique, the magnetic storage tape is unwound from a pay-off reel onto a take-up reel. In this case, a portion of the magnetic storage tape intermediate the pay-off and take-up reels is applied against that zone of the surface to be tested by an elastic pressure roller and unwound in contact with the zone of the test specimen which is simultaneously magnetized continuously by means of a follower magnetizing device. Scanning the magnetic storage tape wound onto the take-up reel for stored defect leakage fluxes is performed subsequently in a separate electronic scanning unit.

Still another known magnetographic inspection technique uses an endless magnetic storage tape riding on the surface of the test specimen between two return reels instead of the magnetic storage tape unwinding in contact with the surface of the test specimen between a pay-off reel and a take-up reel. Here again, an elastic pressure roller is provided which ensures continuous intimate contact between the surface of the test specimen and the magnetic storage tape. In addition, a scanning head and an erasing head are provided on the rotating endless storage tape, the former for scanning the rotating magnetic storage tape for stored defect leakage fluxes, the latter for erasing these leakage flux records after scanning to enable new defect leakage fluxes to be recorded during the next revolution of the tape.

Although the techniques described have proved satisfactory in many cases, there are certain testing situations where their application has failed in the past. For example, problems have been encountered in testing locations to which access is difficult, such as overhead surfaces or test objects under water. In these cases, the comparatively heavy weight of the pay-off device, whether with unwinding or with endless magnetic storage tape, precludes its use from the start. Even the mere application of magnetic storage tapes to the surface to be tested is often difficult in these cases, e.g., their application to overhead surfaces or under water, the latter case being made especially difficult in moving water. There is, however, an urgent need for a solution to these difficult testing problems because they also resist application of the other known non-destructive test methods. Thus, the well-known magnetic-particle method is completely unfit for use under water, and certain other methods such as ultrasonic or eddy-current testing also meet with almost insurmountable difficulties in such environments. Similar considerations apply to overhead surfaces, at least as far as magnetic-particle and ultrasonic testing methods are concerned.

Another problem with known magnetographic inspection techniques concerns applications where the magnetic storage tape merely rests on the surface of the test specimen, the zone covered by the storage tape is magnetized and the storage tape then removed and subsequently scanned in a scanning device. During magnetization, the entire area of the magnetic storage tape must be in intimate contact with the surface of the zone to be tested. This is particularly difficult with irregularly shaped, uneven surfaces such as are invariably encountered in testing welds, for example. With magnetic storage tape unwinding across the surface to be tested, this problem can often be improved by use of an elastic pressure roller. Rolling a pressure roller over the applied tape would also be possible in this case, but magnetization would then have to be maintained throughout the interval during which the pressure roller is being rolled off. A brief, pulse-type magnetization of the entire test zone would be sufficient if the complete area of the magnetic storage tape can be kept in intimate contact with the surface of the test specimen.

OBJECTS AND SUMMARY

It is an object of the present invention to extend the range of applicability of magnetographic inspection and to enable testing points with difficult access such as overhead surfaces or test objects located under water.

Another object is to provide sufficiently intimate contact with a magnetic storage tape over the entire zone of the surface of a test specimen which is to be inspected by the magnetic storage tape, even if the surface of the test specimen is of an uneven and irregular configuration.

In accordance with the present invention an adhesive joint is provided between one side of a flexible magnetic storage tape employed as a storage carrier and the surface of that zone of the component or parts to be tested. The tape is adhered to the part surface over the zone to be tested in such manner that the tape is brought into intimate, self-adherent contact with the surface of the zone to be tested. The zone to be tested is magnetized after which the magnetic storage tape is separated from the surface of the tested zone for subsequent scanning inspection. The adhesive joint may be provided, alternatively, by applying a coating of an adhesive compound either to the surface of the zone to be tested or to that side of the magnetic storage tape which is to be bonded. Sometimes, it may be expedient to apply an adhesive coating both to the part surface and to that side of the magnetic storage tape which is to be bonded which will provide an excellent adhesive joint even in difficult cases.

What is achieved by pressing the elastic self-adherent magnetic storage tape against the surface of the test specimen is that the magnetic storage tape is brought into constant intimate contact with the entire zone to be tested of the surface of the test specimen. This is particularly advantageous for test specimen surfaces of an uneven and irregular configuration where in the past intimate contact between the magnetic storage tape and the surface of the test specimen could only be established briefly for the moment during which a pressing force was applied to the magnetic storage tape. According to a further aspect of this invention, luminous pigments or pigments providing a good contrast to the surface of the test specimen may be admixed to the adhesive compound. In this manner, a two-fold effect is achieved: a simple check is provided on whether the relevant surface has been fully coated with adhesive, and ease of finding the coated locations when applying the magnetic storage tape. According to a still further advantageous development of the method in accordance with this invention, the storage carrier is a self-adherent, flexible magnetic storage tape which greatly facilitates the performance of the method. In another development of the method in accordance with this invention, elastic pressure rollers conforming to the profile of the surface of the test specimen are used to press the magnetic storage tape against the surface of the test specimen. In yet another aspect, the magnetic storage tape is reeled up to form rolls in readiness for the test and unwound from these rolls directly onto the surface of the test specimen. The tape may be unwound by hand or alternatively, a special pay-off device may be used which can take a roll of magnetic storage tape.

It is also contemplated to use the magnetic storage tape as a visually readable document after it has been scanned by an electronic scanning device. This can be achieved by visibly marking those points at which the defect leakage fluxes stored in the magnetic storage tape exceed a specific, preselectable value by means of a marking device controlled by the scanning device. Alternatively, the results of the electronic scanning device may be fed to a recorder which records them visibly and in the proper locations on the magnetic storage tape.

To perform the method in accordance with this invention, it is advantageous to use a magnetic storage tape composed of at least two layers; one layer consisting of a flexible material, and the other layer of an adhesive compound.

DESCRIPTION OF PREFERRED EMBODIMENTS

Figure 1:
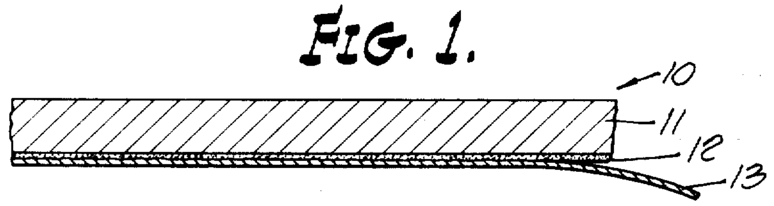
FIGS. 1 and 2 are sections through magnetic storage tapes in accordance with the invention.

FIG. 1 represents a section through one form of a magnetic storage tape 10 constructed in accordance with the present invention. Layer 11, the magnetic storage carrier proper, preferably consists of a highly flexible plastic such as chloroprene polymer in which magnetic particles are embedded in a known manner. The layer 11 may correspond entirely to the storage tapes customarily employed in magnetographic applications at the present time. The underside of the layer 11 is provided with a thin coating 12 of a strongly adhesive compound. Owing to the small thickness of the layer 12, the elastic properties of the layer 11 remain unaffected by the adhesive coating. The high bond strength of the coating 12 with the elasticity and flexibility of the layer 11 has the effect that the magnetic storage tape, when pressed against the surface of a test specimen in a suitable manner, will be uniformly held fast against that surface. In this manner, a sufficiently intimate contact between the magnetic storage tape 10 and the surface of the test specimen can be established even adjacent to rough portions projecting from the surface, for example in the edges adjacent a weld.

To protect the adhesive surface against undesired sticking, a thin protective film 13 may be provided, e.g., a film of polyvinyl chloride. The protective film 13 is peeled off the coating 12 before the magnetic storage tape is applied to the surface of the test specimen. After test and removal of the magnetic storage tape from the surface of the test specimen, the adhesive coating 12 has served its purpose. For subsequent scanning of the magnetic storage tape in a scanning unit, its bonding or adhesive strength must be neutralized and this may be done by powdering the coating 12 with talcum or selective dissolution in a solvent.

Figure 2:
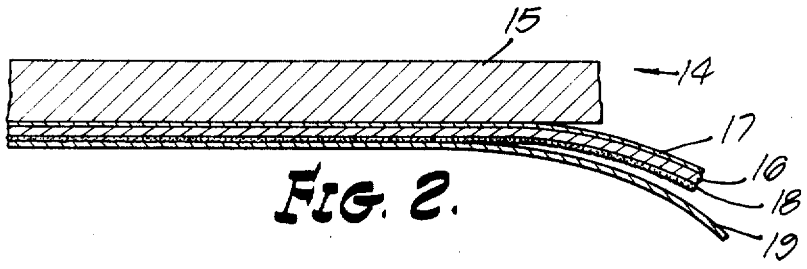

FIG. 2 represents a section through a further form of magnetic storage tape 14. Layer 15 forms the storage carrier proper and is composed similar to layer 11. The carrier for the adhesive coating is a supporting sheet 16 with thin coatings 17 and 18 of an adhesive material applied to its top and bottom surfaces respectively. The supporting sheet 16 need not consist of a flexible or elastic material although materials which lend themselves to plastic shaping, such as polyvinyl chloride or the like, have proved excellent for this purpose. In any case, the total thickness of the layers 16–18 must be kept small to enable the necessarily small distance of about 0.004 inches between the storage carrier and the surface of the test specimen to be maintained. Sometimes, a commercially available two-sided adhesive film can be used instead of the supporting sheet 16 with the adhesive coatings 17 and 18. In other cases, it will be necessary to use different adhesives for the coatings. Here again, a protective film 19 may be provided, which must be then peeled off the coating 18 before the magnetic storage tape 14 is applied to the surface of the test specimen. After removal of the tape from the surface of the test specimen, the combination of layers 16–18 are removed from 15. It is, of course, also possible to remove only the layer 15 and leave the combination of layers 16–18 on the surface of the test specimen for subsequent removal if desired.

Figure 3:
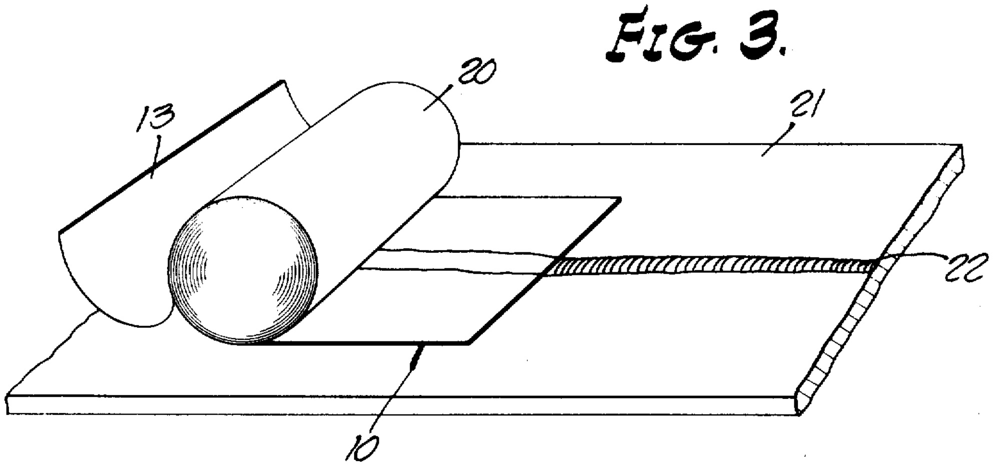
FIG. 3 shows a roll of magnetic storage tape placed on top of a weld.

FIG. 3 shows magnetic storage tape 10 wound into a roll 20 and placed on the surface 21 of a test specimen having a line weld 22. In this application, a tape of the type 10 in FIG. 1 or that represented by the magnetic storage tape 14 of FIG. 2 would be equally suitable. While the magnetic storage tape 10 is being applied, the protective film is removed continuously. This can be done by hand. Similarly, pressing the tape against the surface 21 of the test specimen and against the weld 22 can also be effected manually. It is, however, advisable to apply additional pressure to the weld edges, e.g., by passing the thumb nail along these edges, to assure adherence in those regions.

Figure 4:
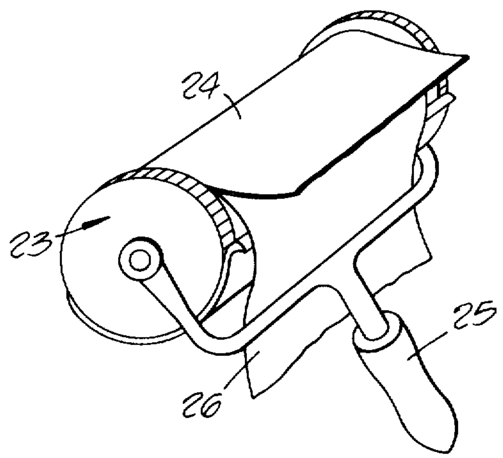
FIG. 4 shows a pay-off device for magnetic storage tape.

Application of the magnetic storage tape is facilitated by a pay-off device 23 in accordance with FIG. 4. This device consists essentially of a roller 23, with magnetic storage tape, a magazine 24 which houses the roll and permits it to rotate in bearings (not visible in the drawing) and a forked handle 25 in which the magazine 24 is movably mounted. The protective film 26 may be removed by pulling it down from time to time as the magnetic storage tape unwinds.

Figures 5, 6:
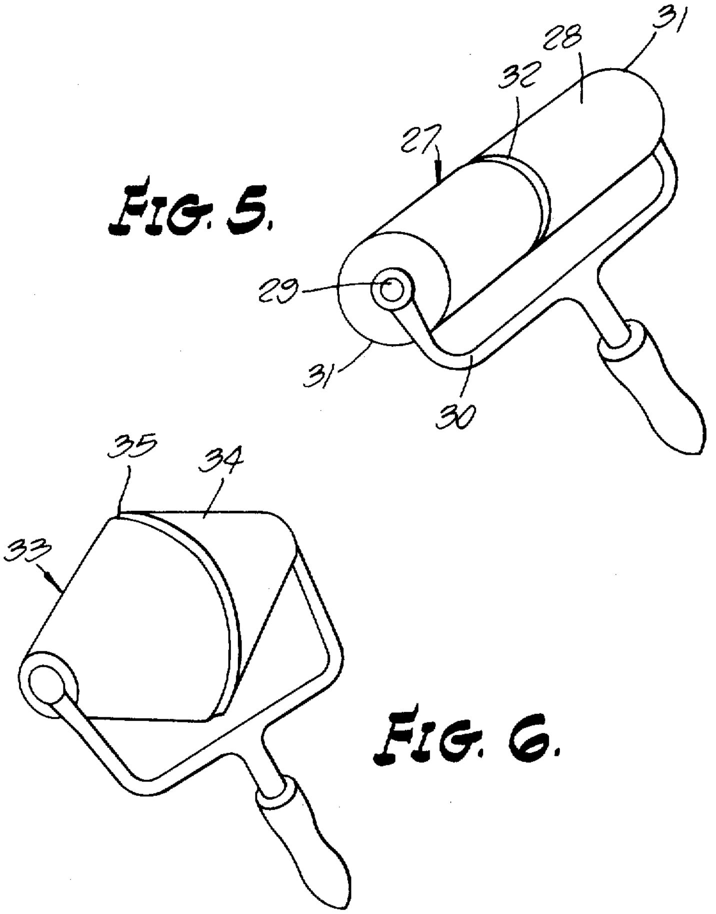
FIGS. 5 and 6 depict a pressure roller for magnetic storage tape.

A further device is the pressure roller 27 in accordance with FIG. 5 by means of which the magnetic storage tape may be forcibly pressed against the surface of the test specimen. Components of the pressure roller are a squeeze roll 28 of an elastic material such as rubber, for example, a fixed axle 29 for the squeeze roll and a forked handle 30. The axle 29 is mounted in the ends of the handle 30. The sharp edges 31 of the squeeze roll may be used to press the tape against edges, such as the edges of the weld 22 in FIG. 3. Alternatively, this squeeze roll may be provided with a centrally located sharp-edged groove 32 serving the same purpose.

Conforming squeeze rolls may be provided to press the magnetic storage tape against specific profiles. Thus, FIG. 6 shows a pressure roller 33 with a squeeze roll 34 in the shape of a double cone and having a groove 35, is mainly intended for fillet welds.

Figure 7:
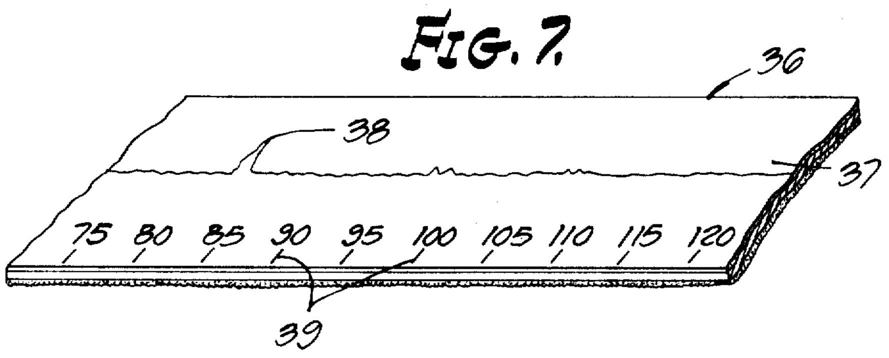
FIG. 7 shows a magnetic storage tape with a coating for graphic records.

FIG. 7 shows a piece of a magnetic storage tape 36 one of whose surfaces carries a thin, flexible graphic recording layer 37. This is suitable for recording the peak values 38 of the leakage flux signals obtained upon scanning the magnetic storage tape with an electronic scanning device. A set of continuous graduations 39 along the lower edge of the magnetic storage tape 37 facilitates correlating the recorded location of defect leakage flux on the graphic recording layer to the location of the defect on the test specimen. Proper correlation requires that the start and end of the magnetic storage tape on the surface of the test specimen be marked.

What is claimed is:

1. In a method of magnetographic inspection for defects in ferromagnetic components including magnetizing the zone of a component to be tested and bringing said zone into contact with a flexible magnetic storage tape, whereby the magnetic leakage flux emanating from the surface of the zone to be tested at defect points is stored in the magnetic storage tape, said tape having an adhesive material on one surface covered by a strippable element, the improvement comprising:

applying the magnetic storage tape to the surface of the zone to be tested while simultaneously removing the strippable element such that the adhesive material contacts said surface;

pressing the magnetic storage tape into adherent contact with the surface of the zone to be tested;

magnetizing the component zone; and separating the magnetic storage tape from the zone surface.

2. A method as in claim 1, in which said storage tape is formed into a roll and payed out onto the zone surface while removing the strippable element at the same time.

3. A method as in claim 1, including the further steps, in the order given, of removing the adhesive material from the storage tape, and electronically scanning the tape.

4. A method as in claim 3, in which the storage tape is marked at those regions of the tape which on scanning are found to produce defect indications exceeding a predetermined maximum.

5. A method of recording stray field emanations from a ferromagnetic workpiece, comprising:

forming a roll of magnetic storage tape having an adhesive material on one surface;

paying out the storage tape onto the workpiece, adhesive material down, in loosely adhering condition;

severing the loosely adhered tape from said tape roll;

rolling said tape on the workpiece with a resilient means to thoroughly adhere the tape to the workpiece;

establishing a magnetic field in said workpiece;

stripping the tape of said workpiece; and electronically scanning said tape for storage information.

* * * * *